Jan. 19, 1960
J. THURNHEER
2,921,496
MEANS FOR INFLUENCING THE PATH OF RAYS IN OPTICAL DEVICES
Filed Dec. 5, 1956
2 Sheets-Sheet 1
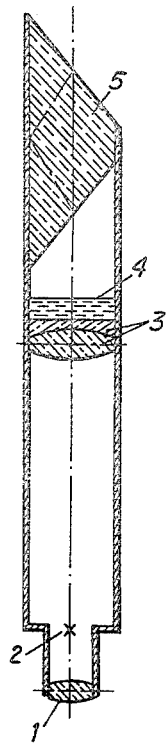
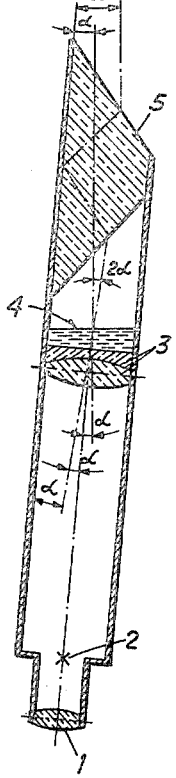
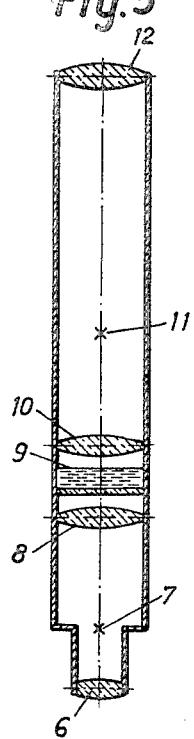
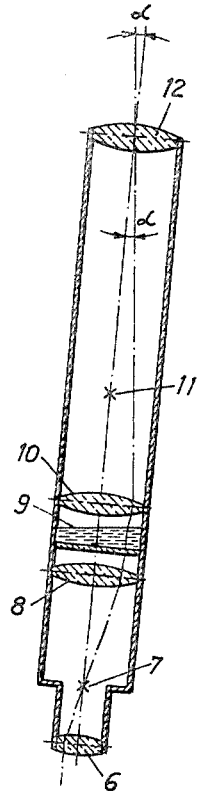
INVENTOR.
JAKOB THURNHEER

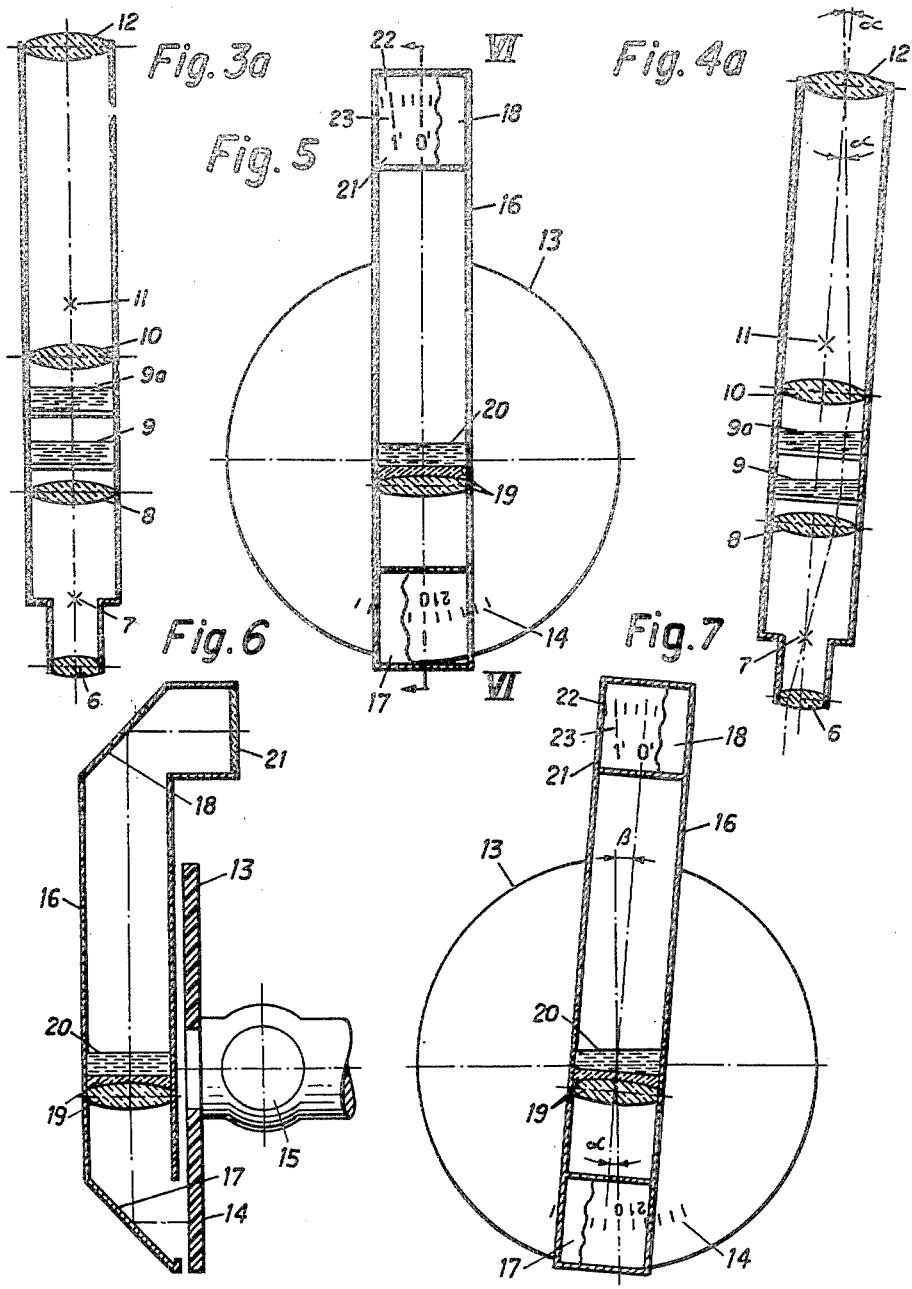

United States Patent Office 2,921,496
Patented Jan. 19, 1960

2,921,496

MEANS FOR INFLUENCING THE PATH OF RAYS IN OPTICAL DEVICES

Jakob Thurnheer, Au, St. Gallen, Switzerland, assignor to Wild Heerbrugg Aktiengesellschaft, Heerbrugg, Switzerland, a Swiss company Application December 5, 1956, Serial No. 626,351

Claims priority, application Switzerland December 12, 1955

2 Claims. (Cl. 88—1)

This invention relates to means for influencing the path of rays in optical devices.

In many optical devices it is desirable to influence the path of rays through the relative position of the device to the earth's gravitational field or to a field of acceleration. By way of example, a compensation is advantageous which, with an approximate orientation, places the optical axis automatically into the position relative to the vertical. In conventional devices of this type, optical members are suspended from wires, springs or other means so that they will assume the desired position under the influence of the force of gravity. The conventional devices for influencing the path of rays are, however, not satisfactory owing to the complex mechanical requirements and arrangements used therein.

According to the present invention, the path of rays in optical devices is influenced in that the path of light is altered by the change of position of a boundary surface of a freely movable refraction medium relative to the optical axis of the device.

Embodiments of the invention are illustrated in the attached drawings, in which—

Fig. 1 is a zenith telescope with Dove prism and a liquid compensator in front of the telescope objective and with the telescope axis placed vertically;

Fig. 2 shows the same zenith telescope with the telescope axis inclined to the vertical by the small angle $\alpha$;

Fig. 3 is a zenith telescope with liquid compensator with parallel path of rays between two lenses of a reversing system with the telescope axis placed vertically;

Fig. 3a is a view similar to Fig. 3 but of a modified form of zenith telescope;

Fig. 4 is the zenith telescope as shown in Fig. 3 with the telescope axis inclined by the small angle $\alpha$;

Fig. 4a is a view similar to Fig. 4 but of the modified form shown in Fig. 3a;

Fig. 5 shows an indicator of the vertical circle of a measuring instrument (theodolite, alidade) rigidly connected to the instrument arranged vertically;

Fig. 6 is a vertical section along vertical line VI—VI in Fig. 5;

Fig. 7 shows the same indicator with the instrument inclined.

If a clear liquid the surface of which will at all times be horizontal under the influence of the force of gravity is placed in the optical path of rays, a ray of light passing through the said liquid normal thereto will not be deflected. If the ray of light enters the liquid surface at an angle, it will be deflected on leaving the liquid in accordance with the optical law of refraction.

If the angle which the ray rising through the liquid encloses with the vertical equals $\alpha$ and the index of refraction of the liquid equals $n$, the angle $\beta$ which the ray emerging from the liquid forms with the vertical is determined by the following equation:

$$\sin \beta = n \cdot \sin \alpha$$

If the angles $\beta$ and $\alpha$ are very small, $\sin \beta$ may be assumed to equal $\beta$ and $\sin \alpha$ to equal $\alpha$ so that $$\beta = n \cdot \alpha$$

and $\beta > \alpha$ if the index of refraction exceeds 1. This assumption is the basis of the embodiment according to Figs. 1 and 2.

These figures show a zenith telescope comprising an eyepiece 1, the reticle 2, objective 3 and a Dove prism 5, which is rigidly connected with the telescope and has its reflector face arranged parallel with the axis of the telescope. Above the objective is a liquid layer 4 one boundary surface of which is held rigid relative to the telescope by the said objective.

In Fig. 1, the telescope axis which is here shown to be vertical, intersects the upper objective surface and the liquid surface at a right angle, is then deflected by the first face of the Dove prism to its reflector face, which is parallel with the telescope axis, symmetrically reflected upwardly by the said face and deflected back at the top face of the Dove prism by the same angle by which it was deflected at the lower face, so that the axis is again vertical.

Fig. 2 shows the optical axis of the telescope inclined to the vertical by the angle $\alpha$. Its course is straight until deflected at the top surface of the liquid in such a manner that after passing the liquid it will form the angle $2\alpha$ with the vertical and consequently again angle $\alpha$ with the reflector face of the Dove prism. The two deflections and the reflection in the Dove prism cause the optical axis again to form the angle $\alpha$ with the reflector face of the Dove prism when emerging from the said prism. As the reflector face is inclined to the vertical by the angle $\alpha$, the optical axis will again be vertical when the ray emerges from the Dove prism.

In order for the angle of inclination $\alpha$ between the vertical and the optical axis to be doubled when passing through the surface of the liquid, $n \cdot \sin \alpha$ must equal $\sin 2\alpha$. As $\alpha$ is a small angle, $n$ must accordingly equal 2. However, suitable liquids having an index of refraction=2 can hardly be found. But it is easily proved that compensators arranged behind one another as in Fig. 3a and Fig. 4a having an index of refraction equalling 1.5 will have the same effect. If necessary, several liquid compensators having a smaller index of refraction may be provided.

If a predetermined axis of collimation $\delta$ other than the vertical is desired, the angle formed by the reflector face of the Dove prism and the axis of the telescope must be one-half of this inclination of the axis, i.e. equal $\delta/2$. For inclinations exceeding approximately 60° to the vertical, the Dove prism may be replaced by an ordinary mirror. If a horizontal aiming axis is required, the mirror face is arranged at an angle of 45° to the telescope axis.

Figs. 3 and 4 show a zenith telescope in which a reversal system formed by the lenses 8 and 10 is arranged between an observation end or eyepiece 6 and objective 12. The telescope reticle plate is indicated at 7, while 11 indicates the point of intersection between the image plane of the telescope objective and the telescope axis. A liquid layer 9, or a pair of liquid layers 9 and 9a as in Fig. 3a, is provided between lenses 8 and 10 of the reversal system, one boundary surface of the liquid being formed by a glass pane which is rigidly arranged in the telescope.

In Fig. 3 a ray of light entering the centre of the objective vertically from above follows the vertical telescope axis and passes the reversal system and the compensator undeflected to reach the centre of the reticle plate 7, and hence passes through the eye piece into the observer's eye.

In Fig. 4 the entire assembly is inclined for the telescope axis to form angle α with the vertical. The vertical ray of light entering the centre of the objective forms the angle α with the telescope axis also after passing through the objective, reaches the side of lens 10, is deflected toward the lens axis, and passes into the liquid. Owing to the inclination, the liquid forms an optical wedge which deflects the ray by a small angle oppositely to the deflection occurring in lens 10, and the ray is then deflected towards the eyepiece by lens 8. If a compensator having a suitable index of refraction is employed, the ray may be passed through the centre of the reticle plate 7. This enables a ray reaching the objective in a vertical direction to pass through the centre of the reticle plate 7 despite the inclination of the telescope, i.e. that the telescope will be aimed at the zenith point despite being placed only approximately vertical.

Figs. 5, 6 and 7 show the vertical circle 13 of a measuring instrument (theodolite, alidade etc.) connected to an aiming telescope, and the indicator device associated therewith. Provided on the vertical circle 13 of the instrument is a circular scale 14. Rigidly connected to the vertical circle is the sighting telescope 15 (Fig. 6). In front of the circle 13 is the indicator device comprising the housing 16, the mirrors 17 and 18 arranged at an angle of 45°, the index plate 21, objective lens 19 and a liquid layer 20 arranged above the objective lens. A portion of the circular scale 14 is shown at 23; the scale of the index plate is shown at 22.

The circle 13 is rigidly connected to the sighting telescope 15 which will always be aimed at the same target point for the purpose of this description. The circle is accordingly always identically positioned in space. The zero direction line of the circle (straight line connecting centre of circle and zero line of circle) is assumed to be vertical.

The housing 16 is arranged in front of circle 13 (Figs. 5 and 6) and carries the mirror 17 inclined at an angle of 45° towards the plane of the circle, the mirror 17 reflecting the circular scale 14 upwardly through the two-lens objective 19 and the liquid 20, and, after reflection by mirror 18, to the index plate 21 at the observation end of the housing where a section of the scale 14 is reproduced as image 23.

The scale 22 of the index plate 21 has divisions substantially reduced against the image 23 of scale 14 so that small fractions of a division of scale 14 can be indicated.

In Fig. 7 the circle 13 is similarly placed as in Fig. 5 while the vertical axis and the indicator device are inclined to the vertical by angle α. The ray of light passing obliquely from the zero line to the centre of the objective is therefore deflected to the right when passing through objective and compensator, and the index of refraction $n$ of the liquid should be selected so that image O' of O falls on the zero line of the index scale 22. The angle $\beta$ must be only slightly larger than α, and the index of refraction $n$ little larger than 2. Instead of the one compensator having $n>2$, two compensators having an index of refraction $n>1.5$ are advantageously arranged one behind the other in the manner illustrated in Fig. 3a and Fig. 4a.

Many further applications are possible besides the examples described. By way of example, an optical clinometer may be provided by the dependence of the one liquid surface on the position of the earth's surface and the deflection of rays caused thereby.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An optical system for influencing the path of light rays in an optical device having a circular scale comprising, a housing having an observation end, said housing further having a first mirror for reflecting an image of a section of said circular scale, a second mirror in said housing for directing an image to said observation end, at least one objective lens in said housing between said mirrors, and at least one liquid refraction layer disposed between said lens and said second mirror, said optical system having an optical axis, said liquid refraction layer having one boundary surface which is rigidly arranged normal to said optical axis and another surface freely movable to a horizontal position under the influence of the force of gravity so that small deviations of said housing and said optical axis are compensated so that said image of a section of said circular scale reflected by said first mirror will be reflected by said second mirror to said observation end.

2. An optical device according to claim 1 wherein the index of refraction of said liquid layer is at least 1.5.

References Cited in the file of this patent
UNITED STATES PATENTS

| | | |
|---|---|---|
| 1,555,794 | Bedell | Sept. 29, 1925 |
| 2,124,892 | Nichols | July 26, 1938 |
| 2,395,921 | Thurlow | Mar. 5, 1946 |
| 2,460,836 | Lovins | Feb. 8, 1949 |
| 2,707,898 | Horsfall | May 10, 1955 |
| 2,758,500 | Eckweiler | Aug. 14, 1956 |